United States Patent
Cox et al.

(10) Patent No.: US 8,031,759 B2
(45) Date of Patent: Oct. 4, 2011

(54) CONFIGURING TRANSMISSION SIGNALS

(75) Inventors: Ross Mitchell Cox, Fair Have, NJ (US); Mihir Pise, Sayreville, NJ (US); Kaushik Das, Sunnyvale, CA (US)

(73) Assignee: Ikanos Communications, Inc., Fremont, CA (US)

( * ) Notice: Subject to any disclaimer, the term of this patent is extended or adjusted under 35 U.S.C. 154(b) by 1236 days.

(21) Appl. No.: 11/686,420

(22) Filed: Mar. 15, 2007

(65) Prior Publication Data

US 2007/0217492 A1   Sep. 20, 2007

Related U.S. Application Data

(60) Provisional application No. 60/782,291, filed on Mar. 15, 2006, provisional application No. 60/782,290, filed on Mar. 15, 2006.

(51) Int. Cl.
*H04B 1/38* (2006.01)

(52) U.S. Cl. ...................................... 375/222

(58) Field of Classification Search .................. 370/509; 375/222, 295; 379/32.01, 111, 399.01
See application file for complete search history.

(56) References Cited

U.S. PATENT DOCUMENTS

| | | | |
|---|---|---|---|
| 7,400,720 B2 * | 7/2008 | Savoor et al. | 379/399.01 |
| 2002/0080824 A1 * | 6/2002 | Wingrove | 370/509 |
| 2002/0181609 A1 * | 12/2002 | Tzannes | 375/295 |
| 2005/0213714 A1 * | 9/2005 | Langberg et al. | 379/32.01 |
| 2006/0280237 A1 * | 12/2006 | Rhee et al. | 375/222 |
| 2007/0011559 A1 * | 1/2007 | Cioffi et al. | 714/755 |
| 2007/0143498 A1 * | 6/2007 | Uhlemann | 709/238 |

* cited by examiner

*Primary Examiner* — David C. Payne
*Assistant Examiner* — Leon-Viet Nguyen
(74) *Attorney, Agent, or Firm* — Thomas, Kayden, Horstemeyer & Risley, LLP (57) ABSTRACT

Included are embodiments for reducing interference in a communications network. At least one embodiment of a method includes receiving data related to an updated Power Spectral Density (PSD) mask and processing a first Seamless Rate Adaptation (SRA) request. Some embodiments include processing a second Seamless Rate Adaptation request and implementing the updated Power Spectral Density mask.

20 Claims, 6 Drawing Sheets

CONFIGURING TRANSMISSION SIGNALS

CROSS-REFERENCE TO RELATED APPLICATION

This application claims the benefit of U.S. provisional application No. 60/782,291, filed Mar. 15, 2006, which is incorporated by reference in its entirety. The application also claims the benefit of U.S. provisional application No. 60/782,290, filed Mar. 15, 2006, which is also incorporated by reference in its entirety.

BACKGROUND

Digital Subscriber Line (DSL) modems may be configured to use advanced modulation techniques to send high rate digital data across the distribution lines of the telephone network (the local loop). A limiter of data rate for these modems is crosstalk from other DSL data sessions on other lines in the same cable binder. On the central office side (CO), this binder may terminate at a DSLAM (Digital Subscriber Line Access Multiplexer). Since the modems in a DSLAM are collocated, there arises the opportunity to coordinate the signals transmitted by these modems in order to reduce their interference with one another. However, many current solutions are unable to achieve this coordination without disrupting DSL communications. Specifically, they are unable to provide the necessary data and they are unable to use this data to reshape the transmit signals. Both of these steps are necessary for reducing the crosstalk.

Additionally, in ADSL2/ADSL2+ (Asymmetric Digital Subscriber Line Bis and Bis+ standards), by using Dynamic Spectrum Management (DSM) techniques, a central office (CO) can maximize channel throughput. Further, by utilizing DSM, a Central Office Digital Subscriber Line Access Multiplexer (DSLAM) may be configured to calculate dynamic Transmit Spectral Shaping at bin "i" (DTSSi) for all channels. DTSSi is an invented mechanism and is similar in definition to the TSSi that is defined in the ADSL2/2+ standards. The difference between DTSSi and TSSi is that, whereas TSSi are not allowed to change during a CO and CPE communication session, the DTSSi are allowed to change during the session. Another challenge in such a DSL environment is to pass DTSSi values for all bins as well as a desired (or target) Signal to Noise Ratio Margin (SNRM) to the customer premises equipment (CPE) through the overhead channel. Further, many current implementations do not have a defined protocol when utilizing G992.3 and G992.5 standards, which are incorporated herein by reference.

Thus, a heretofore unaddressed need exists in the industry to address the aforementioned deficiencies and inadequacies.

SUMMARY

Included are embodiments for reducing interference in a communications network. At least one embodiment of the method involves the reception by the Customer Premises Modem or Equipment (CPE) of data related to an updated Power Spectral Density (PSD) mask and the sending from the CPE to the CO modem of a first Seamless Rate Adaptation (SRA) request based upon this received data. At the same time as the CO is processing this first SRA request, it will implement an updated Power Spectral Density mask. In some embodiments the CPE may then initiate a second Seamless Rate Adaptation request for the purpose of optimizing some of the session parameters. The first and the second SRA may be designed to provide immunity to the network against the non-stationary crosstalk environment that can result from similar processes taking place simultaneously on the other modems sharing the medium.

Also included are embodiments of a system for reducing interference in a communications network. At least one embodiment of a system includes a first receiving component configured to receive data related to an updated Power Spectral Density (PSD) mask and a first processing component configured to process a first Seamless Rate Adaptation (SRA) request. Some embodiments include a second processing component configured to process a second Seamless Rate Adaptation request and an implementing component configured to provide immunity to the network against the non-stationary crosstalk environment that can result from similar processes taking place simultaneously on the other modems sharing the medium.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

As indicated above, embodiments disclosed herein include updating a transmission Power Spectral Density in a DSL modem. Requests for updating the transmission PSD may be sent to one or several of the collocated modems, which may be transmitting on a shared medium (e.g., a cable binder).

Therefore, considering that the transmission signals of these collocated modems can interfere with one another, any reshaping of the transmission signal of the modem may be implemented so as to protect the physical layer connection of that modem (from similar processes taking place simultaneously on the other modems sharing the medium). Further, since this reshaping may change the channel characteristics and signal to noise ratio (SNR) at the receiver, this reshaping may be accompanied by an adaptation of some or all of the remote/receiving modem's training parameters. In the case of a Discrete Multi-Tone (DMT) modem, embodiments can include time and frequency domain equalizers, a bits-and-gains table, and/or analog and digital gain settings. Again, it is desired that the updating of these parameters be non-disruptive.

In at least one embodiment, the current invention provides a method for non-disruptively (e.g., without retraining) updating the transmit power spectral densities (PSDs) of self-interfering DSLAM modems and the training parameters of the remote receiving modems during data transmission. This may be combined with a method for designing these power spectral densities to dynamically reduce the self-FEXT experienced by the receiving modems and to thereby optimize the aggregate data rate achieved by all the modems terminating at the DSLAM, an envisioned technology which is referred to as Dynamic Spectrum Management (DSM). DSM is one possible application of the current innovation but there are potentially others. Further, information on DSM may deal primarily with the design of the transmit PSDs and ignore the problem of how to non-disruptively implement these PSDs in an on-going data session.

At least one exemplary embodiment disclosed herein incorporates features which have been standardized and appear in widely used DMT standards, (e.g., ADSL2/2+), and therefore has a potential range of applicability that exceeds any solution not incorporating such features. One of the standardized features may include Seamless Rate Adaptation, or SRA (see ITU-T Recommendation G.992.3, Sec. 10.2.1). SRA is a technique for non-disruptively updating some of the training parameters of a DMT data session in order to optimize the data rate and to equalize the SNRM across frequency bins. However, an SRA originating from a receiving modem may not allow for the modification of the PSD in the transmitting modem, let alone the simultaneous modification of the transmit PSDs in all modems terminating at the same DSLAM. Embodiments disclosed herein achieve this by using multiple SRAs combined with additional steps in the receiver and transmitter, as described below. Further, this change in the PSD of the transmitting modem can be executed simultaneously on multiple lines that are self-interfering (as in the same cable binder).

Figure 1:
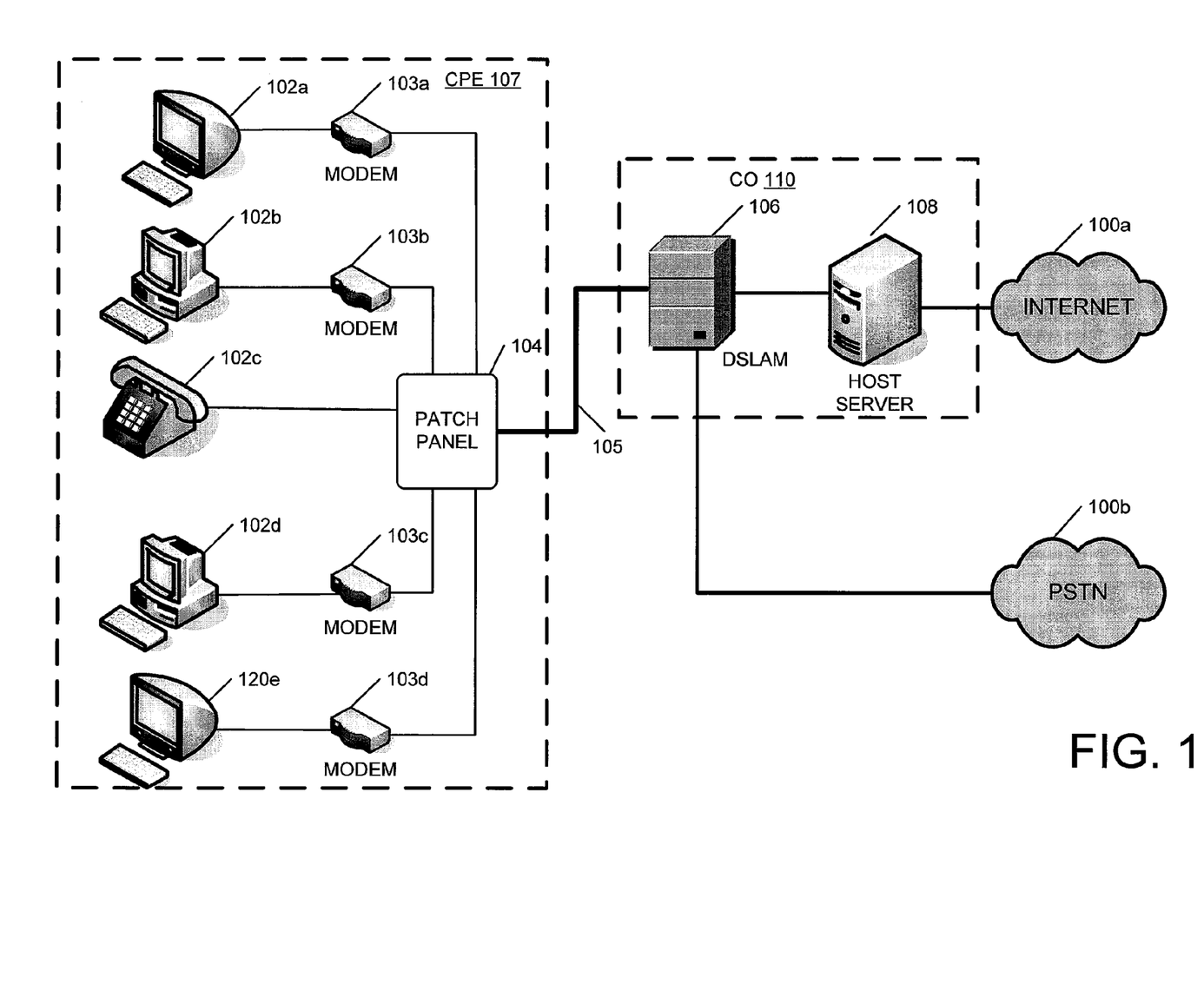
FIG. 1 is an exemplary embodiment of a communications network that may be configured to provide Digital Subscriber Line (DSL) services to a user.

FIG. 1 is an exemplary embodiment of a communications network that may be configured to provide Digital Subscriber Line (DSL) services to a user. As illustrated in the nonlimiting example of FIG. 1, users can access the Internet 100a and/or a Public Switched Telephone Network 100b via user device 102a-102e (referred to collectively as user device 102). More specifically, a user may operate the user device 102 for accessing the Internet 100a. The user device 102 can utilize a modem, such as one or more of the DSL modems 103a-103d for making a request to a Central Office (CO) 110. The modem may be coupled to a patch panel which aggregates several phone lines into a cable binder 105. The cable binder 105 may be coupled to a Digital Subscriber Line Access Multiplexor (DSLAM) 106, which can receive Internet traffic and/or PSTN traffic. The DSLAM 106 is also coupled to a host server 108, which can facilitate communication of at least a portion of the Internet traffic. One should also note that, while not explicitly shown, the DSLAM 106 may include one or more co-located modems and/or other components.

One should note that user devices 102 and modems 103 (and/or other components utilized at or around a customer premises) may be referred to herein as customer premises equipment (CPE) 107. While in at least one exemplary embodiment, the CPE 107 may be physically located at a customer premises, this is a nonlimiting example, as some embodiments may utilize the CPE 107 that is located remotely from a customer premises.

Figure 2:
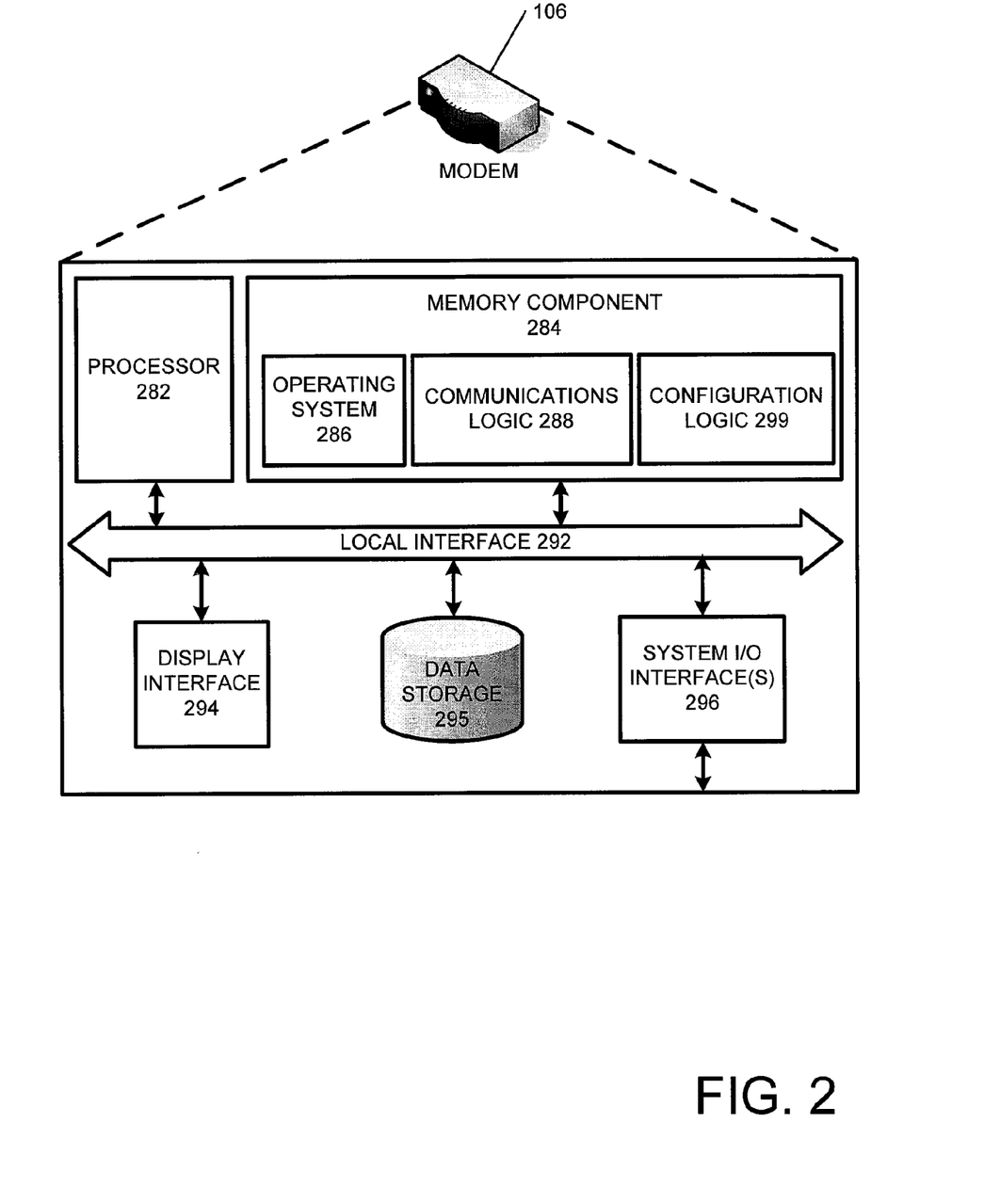
FIG. 2 is an exemplary embodiment of a modem, such as one of the plurality of modems from FIG. 1.

FIG. 2 is an exemplary embodiment of a modem, such as one of the plurality of modems from FIG. 1. As illustrated in FIG. 2, in terms of hardware architecture, the modem 103 may include a processor 282, a memory component 284, a display interface 294, a data storage component 295, and one or more input and/or output (I/O) device interface(s) 296 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 282 may be a hardware device for executing software, particularly software stored in the memory component 284.

The processor 282 can be any custom made or commercially available processor, a central processing unit (CPU), an auxiliary processor among several processors associated with the computing device 104, a semiconductor based microprocessor (in the form of a microchip or chip set), a macroprocessor, or generally any device for executing instructions.

The memory component 284 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory component 284 may incorporate electronic, magnetic, optical, and/or other types of storage media. Note that the memory component 284 can also have a distributed architecture, where various components are situated remotely from one another, but can be accessed by the processor 282.

The software in the memory component 284 may include one or more separate programs, each of which includes an ordered listing of executable instructions for implementing logical functions. In the example of FIG. 2, the software in the memory component 284 may include communications logic 288, configuration logic 299, as well as an operating system 286. Additionally, while the logic components 286, 288, and 290 are each illustrated in this nonlimiting example as a single piece of logic, these components can include one or more separate software, hardware, and/or firmware modules. Similarly, one or more of these logical components can be combined to provide the desired functionality. Additionally, the operating system 286 may be configured to control the execution of other computer programs and may be configured to provide scheduling, input-output control, file and data management, memory management, and communication control and related services. Further, while FIG. 2 illustrates logic components 286, 288, and 290 as residing in the memory component 284, this is a nonlimiting example, as other components, such as Dynamic Spectrum Management (DSM) logic may also reside in the memory component 284.

A system component embodied as software may also be construed as a source program, executable program (object code), script, and/or any other entity comprising a set of instructions to be performed. When constructed as a source program, the program is translated via a compiler, assembler, interpreter, or the like, which may or may not be included within the volatile and nonvolatile memory 284, so as to operate properly in connection with the Operating System 286.

The Input/Output devices that may be coupled to system I/O Interface(s) 296 may include input devices, for example but not limited to, a keyboard, mouse, scanner, microphone, camera, proximity device, receiver, etc. Further, the Input/Output devices may also include output devices, for example but not limited to, a printer, display, transmitter, etc. The Input/Output devices may further include devices that communicate both as inputs and outputs, for instance but not limited to, a modulator/demodulator (modem for accessing another device, system, or network), a radio frequency (RF) or other transceiver, a telephonic interface, a bridge, a router, etc. Similarly, network interface 288, which is coupled to local interface 292, can be configured to communication with a communications network, such as the network from FIG. 1. While this communication may be facilitated via the modem 103, this is not a requirement.

If the modem 103 is embodied in a personal computer, workstation, or the like, the software in the memory component 284 may further include a basic input output system (BIOS) (omitted for simplicity). The BIOS is a set of software routines that initialize and test hardware at startup, start the Operating System 286, and support the transfer of data among the hardware devices. The BIOS is stored in ROM so that the BIOS can be executed when an access point 102 is activated.

When the modem 103 is in operation, the processor 282 can be configured to execute software stored within the memory component 284, to communicate data to with the memory component 284, and to generally control operations of the modem 103 pursuant to the software. Software in memory, in whole or in part, may be read by the processor 282, perhaps buffered within the processor 282, and then executed. Additionally, one should note that while the above description is directed to a modem 103, other devices can also include the components described in FIG. 2. One should note that the user device 102, the DSLAM 106, the host server 108, and/or other components can be configured with one or more of the components and/or logic described above with respect to the modem 103.

Figure 3:
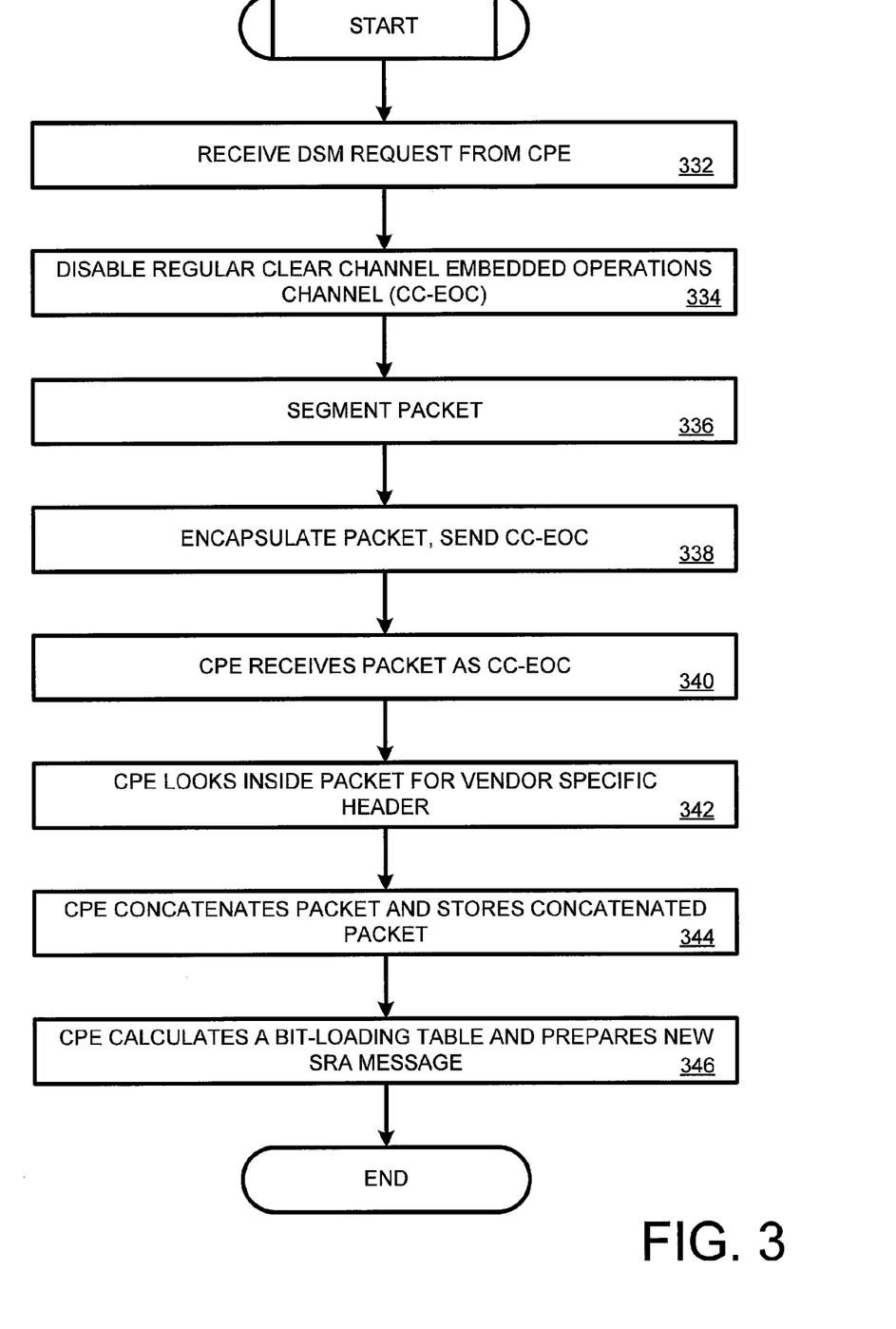
FIG. 3 is a flowchart illustrating an exemplary embodiment of a process that may be utilized by a Central Office (CO) for facilitating the start of a Dynamic Spectrum Management (DSM) message, such as in the network from FIG. 1.

FIG. 3 is a flowchart illustrating an exemplary embodiment of a process that may be utilized by a Central Office (CO) for facilitating the start of a Dynamic Spectrum Management (DSM) message, such as in the network from FIG. 1. As illustrated in the nonlimiting example of FIG. 3, the central office 110 may be configured to receive a DSM request that, depending on the particular configuration, may include a 1026 byte message (block 332). The central office 110 can disable a regular Clear Channel (CC) Embedded Operations Channel (EOC), as illustrated in block 334. The central office 110 may also be configured to segment the received message into a plurality of packets with a vendor-specific header (block 336). The segmented packets may be encapsulated as CC-EOC packets and transmitted to the CPE 107 (block 338). The CPE 107 may accept the packets as a CC-EOC (block 338). The CPE 107 can also look inside the packet for vendor-specific header (block 340). If a vendor specific header is present, the CPE 107 can concatenate and store the concatenated packet (block 342). The CPE 107 can then initiate an SRA (block 344). The CPE 107 can calculate the bit loading table may include the new TSSi and prepare a new SRA message (block 346).

In this manner, at least one embodiment of the present disclosure may be configured to provide a solution to pass dynamic TSSi (DTSSi) information from the CO 110 to the CPE 107. In this technique, existing clear channel EOC may be used to pass information from the CO 110 to the CPE 107. In this manner, there is no need to implement a new protocol in the PMD layer. The CPE 107 may also use an existing SRA protocol, which may be configured to use new DTSSi to calculate bit-loading table. In this manner, it is not necessary to implement a new protocol in the CPE 107.

DTSSi information may be 2 bytes long for each bin. A Signal to Noise Ratio Margin (SNRM) is the target SNR after a DSM has been completed. The CO 110 may be configured to concatenate those two messages and splits the messages into a plurality of CC EOC packets (in at least one embodiment 4 CC EOC packets) and then sends the packets to the CPE 107. The CO 110 can update the DSP using the status: GTI_Set_PSDMASKds. Subsequently, the CO 110 can trigger DSM using the action:GTI_SYNC_DSP_VAR (parameter1:0x3, parameter2:SNRM).

The CO 110 can monitor the DSM trigger, for example every 3 ms. The CO can then segment the 1024+2 bytes long DSM into four packets. First three segments will each be 316 bytes long. This may be utilized where the CPE 107 can only receive 316 bytes long messages. Of this message, for example, 310 bytes may be payload and 6 bytes may be dedicated for DSP header. In this example, the last packet is 102 bytes long.

The CO DSP encapsulates that segment as a CC-EOC packet and passes that to the CPE 107. After the CO DSP receives the ACK from the CPE 107 DSP, it sends the second packet. The CO DSP continues the process until the last segment has been transmitted. In this way, The CO DSP can complete transmission of four packets. One should note that, the above description includes exemplary embodiments. More specifically, values and applications may be modified, as this disclosure is not limited to such embodiments.

Figure 4:
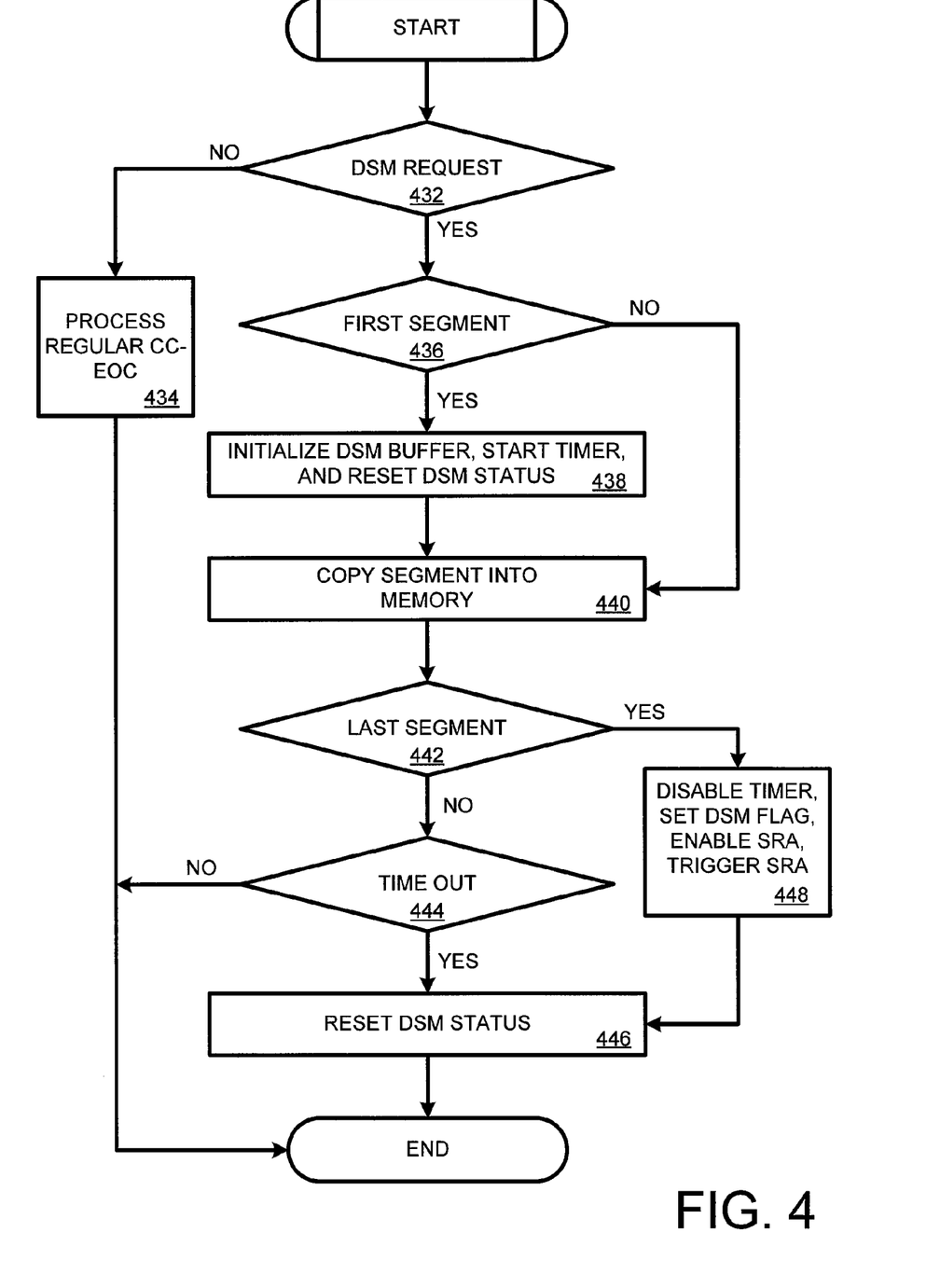
FIG. 4 is a flowchart illustrating an exemplary embodiment of a process that may be utilized by Customer Premises Equipment (CPE) for facilitating the start of a Dynamic Spectrum Management (DSM) message, similar to the flowchart from FIG. 3.

FIG. 4 is a flowchart illustrating an exemplary embodiment of a process that may be utilized by Customer Premises Equipment (CPE 107) for facilitating the start of a Dynamic Spectrum Management (DSM) message, similar to the flowchart from FIG. 3. As illustrated in the nonlimiting example of FIG. 4, the CPE 107 may be configured to determine whether a DSM request is received (block 432) If a DSM request is received at the CPE 107, the CPE 107 can determine whether the data is a first segment (block 436). If the data is a first segment, the CPE 107 can initialize a DSM buffer, start a timer, and reset DSM status (block 438). The CPE 107 can copy the segment into the memory component 284 (block 440).

The CPE 107 can then determine whether this is the final segment of data (block 442). If this is the final segment, the CPE 107 can disable the timer, set a DSM flag, enable an SRA, and Trigger the SRA (block 448). If, on the other hand (at block 442), the CPE 107 determines that this is not the final segment, the CPE 107 can determine whether the timer has timed out (block 444). If not, the process may end. If the timer has expired, the CPE can reset the DSM status (block 446).

Figure 5:
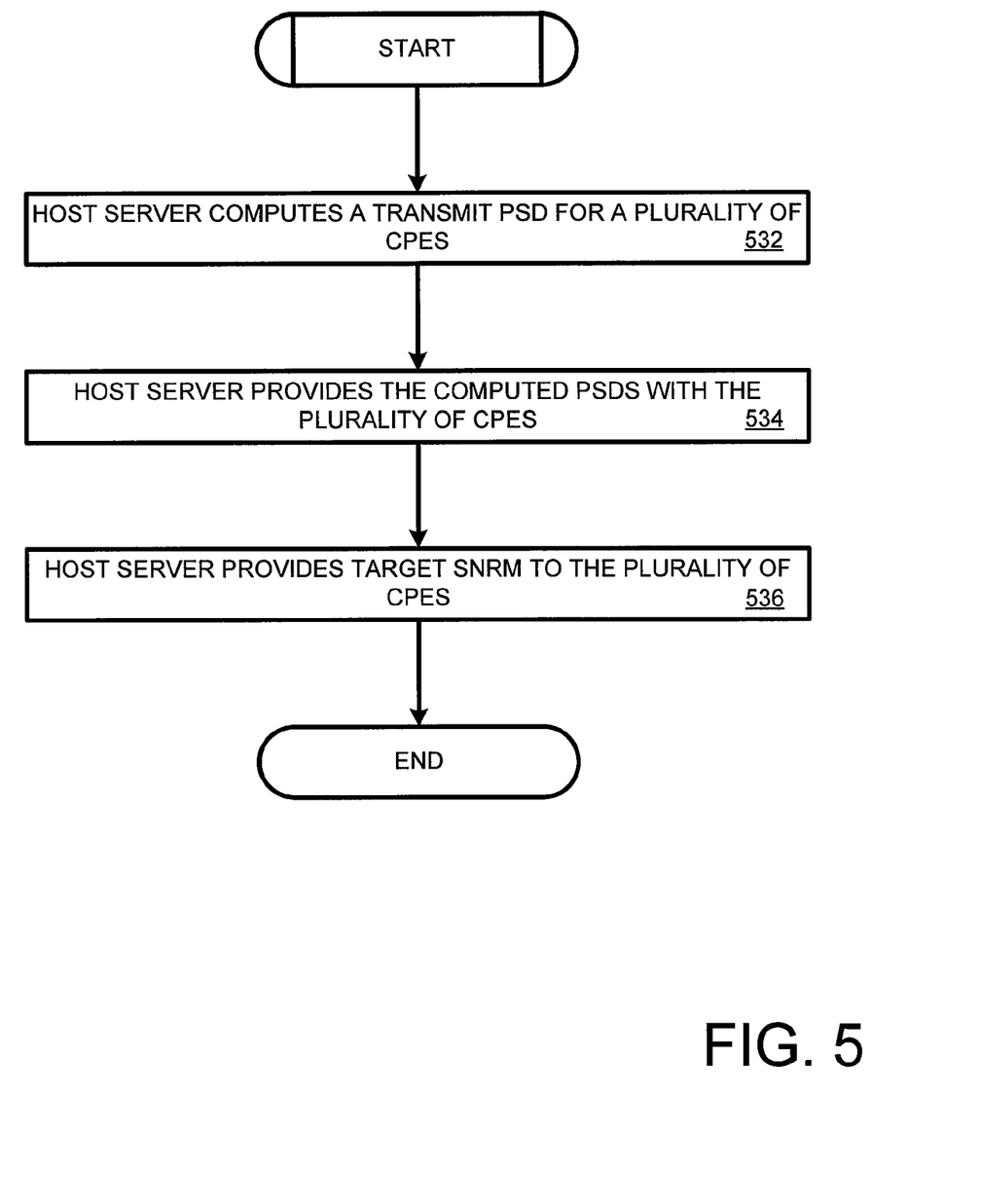
FIG. 5 is a flowchart illustrating an exemplary embodiment of a process that may be utilized for a host server providing a target Signal to Noise Ratio Margin (SNRM) to Customer Premises Equipment (CPE), similar to the flowchart from FIG. 4.

FIG. 5 is a flowchart illustrating an exemplary embodiment of a process that may be utilized for a host server providing a target Signal to Noise Ratio Margin (SNRM) to Customer Premises Equipment (CPE 107), similar to the flowchart from FIG. 4. As illustrated in the nonlimiting example of FIG. 5, the host server 108 can compute a transmit PSD for one or more CPEs 107 (block 532). The host server can provide the computed one or more PSD to the one or more CPEs (block 534). The host server 108 can provide a target Signal to Noise Ratio Margin to the one or more CPEs (block 536).

Figure 6:
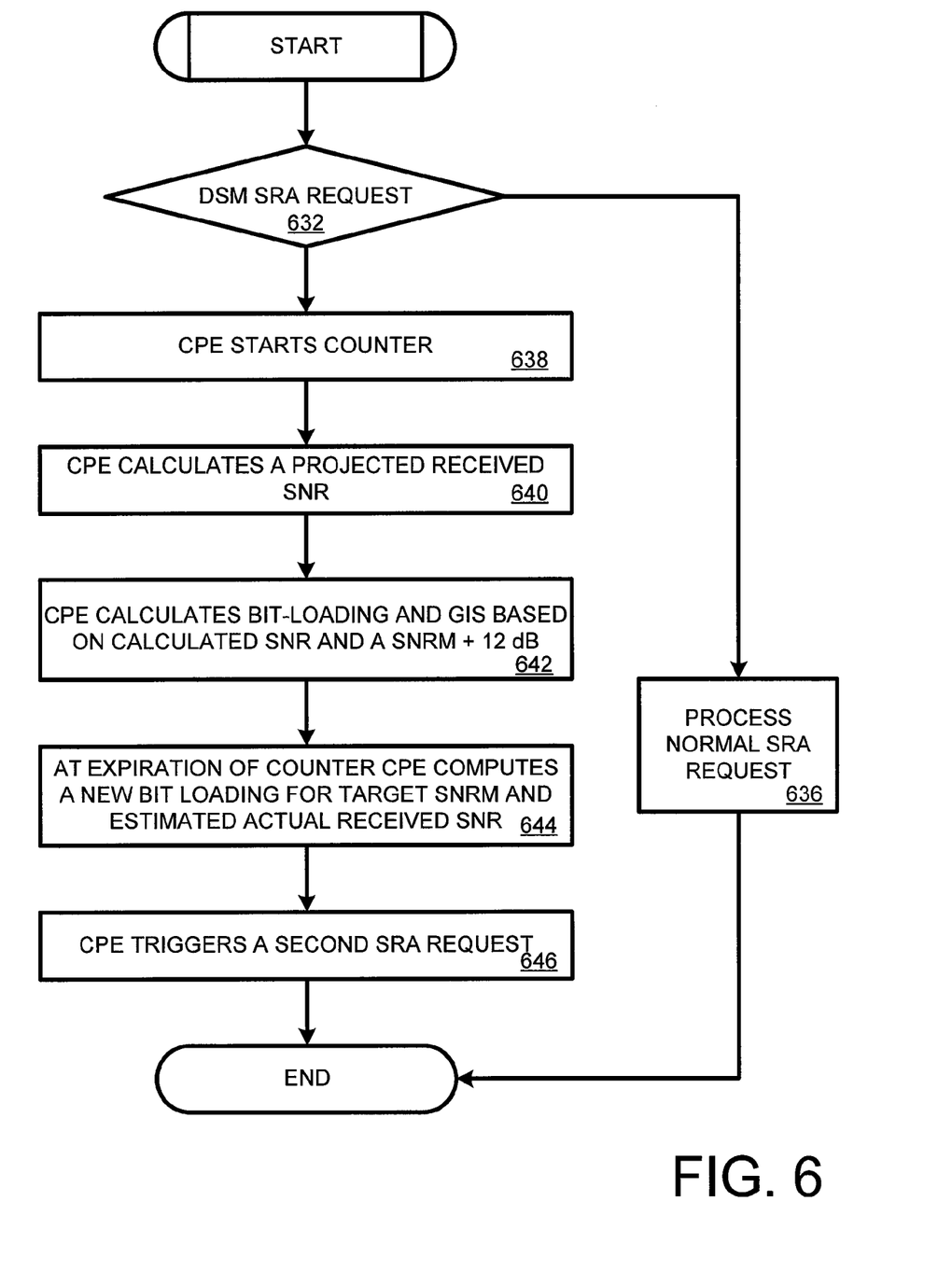
FIG. 6 is a flowchart illustrating an exemplary embodiment of a process that may utilized in facilitating a first Seamless Rate Adaptation (SRA) and a second SRA for reducing interference in a network, such as the network from FIG. 1.

FIG. 6 is a flowchart illustrating an exemplary embodiment of a process that may be utilized in facilitating a first Seamless Rate Adaptation (SRA) and a second SRA for reducing interference in a network, such as the network from FIG. 1. More specifically, as illustrated in the nonlimiting example of FIG. 6, the CPE 107 can determine whether received data is a DSM SRA request (block 632). If the received data is determined to instead be a normal SRA request, the CPE 107 can process the normal SRA request (block 636). If, on the other hand, the received data is a DSM SRA request (block 632), the CPE 107 can begin a counter (block 638). The CPE 107 can calculate a projected received SNR (block 640). The CPE 107 can calculate bit-loading and GIs based on calculated SNR and an SNRM which is arbitrarily higher than the target SNRM (block 642) in order to provide immunity against the non-stationary crosstalk environment that can result from similar processes taking place simultaneously on the other modems sharing the medium.

At the expiration of the counter, the CPE 107 can compute a new bit loading for a target SNRM and estimated actual received SNR (block 644). The CPE 107 can trigger a second SRA request (block 646).

More specifically, in at least one nonlimiting example, the two-sided protocol that supports a single coordinated update of the transmit PSDs in a DSLAM 106 may be referred to as a DSM session. The elements involved in a DSM session include the host server 108, the individual modems in the DSLAM 106 at the CO side 110 of the cable binder 105 termination/network termination, and the individual customer premises (CP) modems 103 and/or CPEs 107 to which they are connected. The host server 108 may be configured to initiate the DSM session by sending, to the modems in the DSLAM 106, the PSDs that the modems are to realize in their transmitters. The host server 108 may also be configured to provide, to one or more modem in the DSLAM 106, a target SNR margin at which the DSLAM expects the modem to operate upon completion of the DSM transmission PSD update. After the host server 108 provides these quantities to the DSLAM 106, there may be little/no further coordination among the components of the CO 110 involved in the session. Therefore, the remainder of the protocol can be described in terms of the operation of a single CO/CP pair supporting a single ADSL2/2+ session.

One should note that while the above description discloses utilization of a particular DSM configuration, this is a non-limiting example. More specifically, embodiments of this disclosure may also be applied to other embodiments of DSM, for instance those that require closer coordination among the CO and CP modems.

Additionally, an on-line transmit PSD reshaping algorithm/protocol may be utilized and may take advantage of the Seamless Rate Adaptation (SRA) feature of the ADSL2/2+ standard. Such an embodiment may also attempt to protect the physical layer data connection from the rapidly changing crosstalk environment while the modems in the DSLAM 106 are updating their transmission PSDs in response to the DSM requests received from the host server 108. In at least one embodiment, the host server 108 may compute the transmission PSDs of the ADSL2/2+ lines terminated at the DSLAM that it wants to update. The host server 108 can download the transmission PSDs in the format of PSD breakpoints or interpolated PSD values per frequency "bin". This may be forced upon one or more components of the CO 110 simultaneously, but perfect timing coordination of this step is not a requirement.

Similarly, in at least one embodiment, the CO 110 may be configured to convey a DSM request to a CPE 107. A DSM request to the CPE 107 may include the Nbins (interpolated) DTSSi linear values and the target SNR margin request. These parameters may be communicated over the overhead channel, and a new header can be defined to uniquely identify a DSM parameters message to the CPE 107. More specifically Nbins may be utilized to determine the number of bins used for transmission. DTSSi may be configured as a data-mode TSSi (Transmit Spectral Shaping at bin "i," defined in the ADSL2/2+ standards).

The DTSSi may be similar in implementation to the TSSi, in that they may specify the per bin spectrum scaling coefficient ranging from linear values of 0 to 1. The DTSSi may differ from the TSSi in that they can be modified during showtime whereas the TSSi may fixed from the discovery phase of startup through showtime. In principle however, both achieve a similar goal, which may include providing a transmit signal scaling relative to the nominal PSD. In the event of a successful DSM PSD update, the DTSSi may replace the TSSi or any previous DTSSi. The DTSSi may be derived from the new PSD requested by the host server 108, and in at least one embodiment, may be computed as follows:

$$DTSSi(\text{dB})=NOMPSD(\text{dBm/Hz})-DSMPSDi(\text{dBm/Hz}).$$

In the above algorithm, NOMPSD may include the nominal transmit PSD, as defined in G.992.3. The NOMPSD may be configured to not exceed MAXNOMPSD, which, for the downstream direction, may be specified from the Management Interface Base (MIB) layer. The MAXNOMPSD=max{DSMPSDi}. Similarly, DSMPSDi may include the new DSM PSD mask requested by the host server 108 for bin i. Further, the target SNR margin may be different from the one negotiated at startup/training, or from any specified for previous DSM updates on the connection. After the CO 110 communicates the DSM request to the CPE 107, the CO 110 may act as a slave to the CP for the rest of the DSM update.

The DSM protocol may coexist with other online applications that may be supported on the given connection. Specifically, a DSM may not be initiated until any other pending online reconfiguration (OLR) requests (US/DS SRA/bitswap, etc.) have completed.

A downstream bitswap/SRA request pending at the CO 110 from the CPE 107 may have higher priority. The DSM message may be communicated to the CPE 107 at the conclusion of the downstream bitswap/SRA. An upstream bitswap/SRA request that is generated may be communicated to the CPE 107 ahead of the DSM request, in the interest of stability of the upstream data and overhead channel connection.

The CO 110 may expect an SRA request from the CPE 107 in response to the DSM communication sent by the CO 110. To avoid interpreting a non-DSM-related SRA request from the CPE 107 as a DSM-related request, the protocol may require that the CPE respond to a DSM communication from the CO 110 with a SRA request to the CO 110 no less than 4 superframes duration from the receipt of the DSM communication. Two counters may be implemented, one at the CO 110 and the other at the CPE 107, to facilitate this. The CO 110 may comply with any standard SRA and/or bitswap requests communicated to CO 110 in this intervening 4 superframe duration.

The CPE 107 SRA request generated in response to the DSM communication from the CO 110 may be implemented with the CPE 107 calculating a projected received SNR/bin for the requested transmission PSD. The CPE 107 may then calculate the bit-loading and gi's based on the calculated SNR/bin and a higher SNR margin of 12 dB (the gi's are the fine adjustments to the transmit PSD at each frequency bin i which are necessary to equalize the SNR margin across all bins after an SRA, see ITU-T Recommendations G.992.3 and G.992.5). This SRA request may be referred to as the first SRA, and may be communicated to the CO 110 at the expiration of the 4 superframes counter at the CPE 107. The higher SNR margin for the first SRA offers protection.

More specifically, the calculated SNR on which the bit-loading for the first SRA is based may not reflect the true SNR at the CPE 107 when transmission on the new DSM PSD channel commences. Additionally, the interfering lines located in the same cable bundle may also be involved in a DSM update, and therefore the connection may experience a rapidly changing crosstalk environment for some duration until the lines in the bundle have concluded their first SRA, and thus start transmitting on the new PSDs. The SNR calculation may use the DTSSi values communicated from the CO 110.

At the beginning of the first SRA, the CPE 107 may start a counter that counts down to a suitably large duration, which will be determined based on a worst case estimate of the time it will take for all lines to conclude the first SRA, and for the measured SNR's at the CPE 107 to stabilize (e.g., 90 superframes). At the expiration of this counter, the CPE 107 may compute a new bit-loading, this time for the target SNR margin and the estimated actual received SNR, and trigger a second SRA request.

The CO 110 responds to the first SRA request from the CPE 107 by using the bit-loading and gi from the CPE 107 and the new DSM PSD for transmission. The response to the second SRA request may be similar to the standard SRA case. The DSM PSD may be realized in the transmitter by relative scaling of the nominal PSD by the DTSSi. The nominal PSD of transmission may be determined at initialization by a priori knowledge of the maximum transmit PSD level of the DSM computed PSDs. This may be possible by a setting of the MAXNOMPSDus/ds parameters in the CO 110 by the host server 108 by an available Management Interface Base (MIB) described in the ITU-T G.997.1 standard.

The period between the first and second SRA may be referred to as the transition period. During the transition period, the connection will be free to perform upstream and downstream bit-swapping and standard-SRA, however with the higher target SNR margin, in the interest of connection stability and CRC avoidance. Enabling bitswap and SRA in the transition period for the DSM PSD online update may also reduce the need to boost the SNR margin in the transition period, and thus to achieving a higher data rate during the transition period.

The provision for a higher SNR margin in the transition period, and relying on standard bitswap and SRA tasks to maintain connection stability in the transition period together may ensure this exemplary embodiment can be used for carrying out a transmission PSD update request on multiple interfering channels.

Although the channel characteristics associated with this exemplary embodiment may change as a result of the change in the transmit PSD, not all the training parameters in the receiver are modified. In particular, the analog and digital gain settings and the time domain equalizer remain the same. The total received power of any optimized transmission PSD for various loop lengths and interference scenarios is less than the received power from the default transmit PSD (also given that the total transmit power is constrained to be less than a maximum for both PSD masks compared). Since any older transmit PSD may be sub-optimal compared to the new transmit PSD that is requested to be implemented, and the total power may be constrained to the same maximum throughout the duration of the connection, the result obtained from simulations that the total received power following the PSD update may be configured to never exceed the previous total received power is applicable in a real deployment scenario. This allows one to not retrain the analog and digital coarse gains, at the expense of some sub-optimality in utilizing the available dynamic range of the analog-to-digital conversion (ADC). However, it can be shown that the signal-to-quantization noise ratio (SQNR) is most affected in the frequencies that already suffer from low SNR, which subsequently carry only a small percentage of the total information payload, by design of the DSM PSD. Therefore, any performance loss due to this may be negligible.

Since the physical channel (other than the transmission PSD) may be configured to not change (the physical channel may be configured to change if it is not possible to bypass retraining the coarse gains, as that can potentially significantly alter the physical channel). As such, the time-domain equalizer may not be required to retrain. This can reduce the complexity of the protocol for enabling the seamless and non-disruptive transmission using a new PSD during an existing data mode session. Therefore, the ability to bypass the need to update these parameters without affecting the data and error rate is an advantage of this embodiment.

Embodiments disclosed herein may differ in one respect from the standardized TSSi feature in that the transmit PSDs for all the modems in a DSLAM may be simultaneously and non-disruptively updated during showtime and this can be done more than once for each modem in the DSLAM during the course of its data session. By contrast, in TSSi, the transmit shaping may be executed once before training. As indicated above, "non-disruptively" may include a configuration without retraining or introduction of CRCs. Also as described above, embodiments disclosed herein may enable a request to change the transmission PSD seamlessly in data mode, without disruption to the data services supported by the physical layer. This may also be different from the standard SRA or bitswap, which may be configured to adapt some training parameters (namely bit-loading and fine gains) to changing SNR at the receiver.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

Additionally, embodiments discussed herein may be implemented in (and/or associated with) one or more different devices. More specifically, depending on the particular configuration, operations discussed herein may be implemented in a set-top box, a satellite system, a television, a portable appliance, a gaming unit, a personal computer, an MP3 player, an iPod® player, a cellular telephone, a wireless communication receiver, a Digital Subscriber Line (DSL) modem, a wireline communication system and/or other devices.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for reducing interference in a communications network, comprising:
   receiving data related to an updated power spectral density (PSD) mask;
   determining whether the data includes a dynamic spectrum management (DSM) seamless rate adaptation (SRA) request;
   in response to determining that the data includes the DSM SRA request, processing the DSM SRA request, including computing a bit loading for a target signal to noise ratio margin (SNRM);
   triggering transmission of a second SRA request;
   in response to receiving the second SRA request, processing the second SRA request; and
   implementing the updated PSD mask.

2. The method of claim 1, wherein receiving the data includes receiving at least one of the following: a target SNRM and the updated PSD mask.

3. The method of claim 1, further comprising:
   receiving the data from a central office (CO); and
   determining whether the data includes a normal SRA request.

4. The method of claim 3, further comprising, in response to determining that the data includes a normal SRA request, processing the normal SRA request.

5. The method of claim 1, further comprising:
   receiving the data from a central office (CO); and
   determining whether the data includes a request to update a PSD mask.

6. The method of claim 1, wherein processing the first DSM SRA request comprises:
   starting a counter;
   calculating a projected received signal to noise ratio (SNR);
   calculating a first bit-loading based on the calculated SNR and an actual SNRM, the actual SNRM being incremented to a value arbitrarily higher than the target SNRM; and
   at expiration of the counter, computing a second bit-loading for a target SNRM and an estimated actual received SNR.

7. The method of claim 1, further comprising:
   starting a timer; and
   preventing the processing of the second SRA until expiration of the timer.

8. A system for reducing interference in a communications network, comprising:
   a first receiving component configured to receive data related to an updated power spectral density (PSD) mask;
   a first determining component configured to determine whether the data includes a dynamic spectrum management seamless rate adaptation (SRA) request;
   a first processing component configured to, in response to determining that the data includes the DSM SRA request, process the DSM SRA request, including computing a bit loading for a target signal to noise ratio margin (SNRM);
   a triggering component configured to trigger transmission of a second SRA request;
   a second processing component configured to, in response to receiving the second SRA request, process the second SRA request; and
   an implementing component configured to implement the updated PSD mask.

9. The system of claim 8, wherein the first receiving component is further configured to receive at least one of the following: a target SNRM and the updated PSD mask.

10. The system of claim 8, further comprising:
a second receiving component configured to receive the data from a central office (CO); and
a second determining component configured to determine whether the data includes a normal SRA request.

11. The system of claim 10, further comprising, a third processing component configured to, in response to the determination that the data includes the normal SRA request, process the normal SRA request.

12. The system of claim 8, further comprising:
a third receiving component configured to receive the data from a central office (CO); and
a third determining component configured to determine whether the data includes a request to update a PSD mask.

13. The system of claim 8, wherein first processing component is further configured to:
start a counter;
calculate a projected received signal to noise ratio (SNR);
calculate a first bit-loading based on the calculated SNR and an actual SNRM, the actual SNRM being incremented to a value arbitrarily higher than the target SNRM; and
at expiration of the counter, compute a second bit-loading for a target SNRM and an estimated actual received SNR.

14. The system of claim 8, further comprising:
a starting component configured to start a timer; and
a preventing component configured to prevent processing of the second SRA until expiration of the timer.

15. A system for reducing interference in a communications network, comprising:
means for receiving data related to an updated power spectral density (PSD) mask;
means for determining whether the data includes a dynamic spectrum management seamless rate adaptation (SRA) request;
means for, in response to determining that the data includes the DSM SRA request, processing the DSM SRA request, including computing a bit loading for a target signal to noise ratio margin (SNRM);
means for triggering transmission of a second SRA request;
means for, in response to receiving the second SRA request, processing a second SRA request; and
means for implementing the updated PSD mask.

16. The system of claim 15, wherein the means for receiving data related to the PSD is further configured to receive at least one of the following: a target SNRM and the updated PSD mask.

17. The system of claim 15, further comprising:
means for receiving the data from a central office (CO); and
means for determining whether the data includes a normal SRA request.

18. The system of claim 17, further comprising, means for, in response to the determination that the data includes the normal SRA request, processing the normal SRA request.

19. The system of claim 15, further comprising:
means for receiving the data from a central office (CO); and
means for determining whether the data includes a request to update a PSD mask.

20. The system of claim 15, wherein the means for processing the DSM SRA request is further configured to:
start a counter;
calculate a projected received signal to noise ratio (SNR);
calculate a first bit-loading based on the calculated SNR and an actual SNRM, the actual SNRM being incremented to a value arbitrarily higher than the target SNRM; and
at expiration of the counter, compute a second bit-loading for a target SNRM and an estimated actual received SNR.

* * * * *

UNITED STATES PATENT AND TRADEMARK OFFICE
CERTIFICATE OF CORRECTION

PATENT NO. : 8,031,759 B2  Page 1 of 1
APPLICATION NO. : 11/686420
DATED : October 4, 2011
INVENTOR(S) : Cox et al.

It is certified that error appears in the above-identified patent and that said Letters Patent is hereby corrected as shown below:

On the Title Page, in Item (75), under "Inventors", in Column 1, Line 1,
    delete "Fair Have," and insert -- Fair Haven, --, therefor.

Signed and Sealed this
Thirteenth Day of August, 2013

Teresa Stanek Rea
*Acting Director of the United States Patent and Trademark Office*